US011929560B2

(12) United States Patent
Komura

(10) Patent No.: US 11,929,560 B2
(45) Date of Patent: Mar. 12, 2024

(54) ANTENNA DEVICE AND RADIO COMMUNICATION DEVICE INCLUDING THE SAME

(71) Applicant: Murata Manufacturing Co., Ltd., Kyoto (JP)

(72) Inventor: Ryo Komura, Kyoto (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 7 days.

(21) Appl. No.: 17/657,174

(22) Filed: Mar. 30, 2022

(65) Prior Publication Data

US 2022/0224008 A1 Jul. 14, 2022

Related U.S. Application Data

(63) Continuation of application No. PCT/JP2020/033117, filed on Sep. 1, 2020.

(30) Foreign Application Priority Data

Oct. 3, 2019 (JP) ................................ 2019-182742

(51) Int. Cl.
*H01Q 5/00* (2015.01)
*H01Q 1/38* (2006.01)
(Continued)

(52) U.S. Cl.
CPC ............... *H01Q 5/321* (2015.01); *H01Q 1/38* (2013.01); *H01Q 5/20* (2015.01); *H01Q 9/0414* (2013.01)

(58) Field of Classification Search
CPC .......... H01Q 5/321; H01Q 5/20; H01Q 9/285; H01Q 1/48; H01Q 1/08; H01Q 1/38;
(Continued)

(56) References Cited

U.S. PATENT DOCUMENTS 6,163,300 A 12/2000 Ishikawa et al.
7,598,921 B2 * 10/2009 Ge ........................ H01Q 5/357
343/700 MS (Continued)

FOREIGN PATENT DOCUMENTS

CA 2821190 A1 * 1/2014 ............ H01Q 1/242
CN 100428563 C * 10/2008

(Continued)

OTHER PUBLICATIONS

International Search Report for PCT/JP2020/033117 dated Nov. 24, 2020.

*Primary Examiner* — Vibol Tan
(74) *Attorney, Agent, or Firm* — Pearne & Gordon LLP

(57) ABSTRACT

A dual-band antenna device allowed to perform communication at a first frequency in a predetermined frequency band and at a second frequency in a frequency band higher than the predetermined frequency band includes: a ground conductor; a folded antenna conductor including a first linear part and a second linear part that are caused to face each other at a distance by folding; an LC resonant circuit that is included in the folded antenna conductor, that lets the first frequency pass, and that lets the second frequency attenuate; and a feeding point between the ground conductor and the folded antenna conductor. A narrow gap part is provided between the first linear part and the second linear part of the folded antenna conductor, the narrow gap part measuring a distance shorter than a distance measured in a different portion between the first linear part and the second linear part.

16 Claims, 5 Drawing Sheets

(51) Int. Cl.
*H01Q 5/20* (2015.01)
*H01Q 5/321* (2015.01)
*H01Q 9/04* (2006.01)

(58) Field of Classification Search
CPC ............ H01Q 1/50; H01Q 5/30; H01Q 13/16; H01Q 9/0414
See application file for complete search history.

(56) References Cited

U.S. PATENT DOCUMENTS

| | | | | |
|---|---|---|---|---|
| 8,933,853 | B2 * | 1/2015 | Asanuma | H01Q 9/26 343/702 |
| 10,044,110 | B2 * | 8/2018 | Dong | H01Q 1/521 |
| 10,263,336 | B1 * | 4/2019 | Wong | H01Q 1/521 |
| 10,594,035 | B2 * | 3/2020 | Buskgaard | G08B 13/08 |
| 2002/0084937 | A1 | 7/2002 | Shinichi | |
| 2005/0280579 | A1 | 12/2005 | Liang et al. | |
| 2008/0238778 | A1 * | 10/2008 | Ge | H01Q 1/38 343/700 MS |
| 2012/0274517 | A1 | 11/2012 | Nagoshi et al. | |
| 2012/0287014 | A1 | 11/2012 | Tseng et al. | |
| 2013/0135164 | A1 * | 5/2013 | Asanuma | H01Q 7/00 343/749 |
| 2017/0162948 | A1 * | 6/2017 | Wong | H01Q 5/10 |
| 2018/0183132 | A1 * | 6/2018 | Wong | H01Q 7/00 |

FOREIGN PATENT DOCUMENTS

| | | | |
|---|---|---|---|
| JP | H11-55022 | A | 2/1999 |
| JP | H11-251825 | A | 9/1999 |
| JP | 2002-151949 | A | 5/2002 |
| JP | 2002-158529 | A | 5/2002 |
| JP | 2009-182793 | A | 8/2009 |
| JP | 2012-244620 | A | 12/2012 |
| JP | 2015-053548 | A | 3/2015 |
| WO | 2004/109850 | A1 | 12/2004 |
| WO | 2012/086182 | A1 | 6/2012 |
| WO | 2013/008356 | A1 | 1/2013 |

* cited by examiner

ANTENNA DEVICE AND RADIO COMMUNICATION DEVICE INCLUDING THE SAME

CROSS REFERENCE TO RELATED APPLICATION

This is a continuation of International Application No. PCT/JP2020/033117 filed on Sep. 1, 2020 which claims priority from Japanese Patent Application No. 2019-182742 filed on Oct. 3, 2019. The contents of these applications are incorporated herein by reference in their entireties.

BACKGROUND ART

Technical Field

The present disclosure relates to an antenna device and a radio communication device including the same.

For example, Patent Document 1 discloses what is called a dual-band dipole antenna capable of communication at a frequency in a predetermined low-frequency band and at a frequency in a predetermined high-frequency band. To support the dual-band communication, the dipole antenna includes, as a band elimination filter, an LC parallel circuit on the antenna conductor. The LC parallel circuit passes frequencies in the low-frequency band but attenuates frequencies in the high-frequency band.

Patent Document 1: U.S. Patent Application Publication No. 2005/0280579 Specification

BRIEF SUMMARY

A folded antenna such as a folded dipole antenna is known as a downsized antenna. A dual-band antenna can also be downsized likewise. However, the folding has caused the deterioration of antenna efficiency in a high-frequency band on occasions.

Hence, the present disclosure addresses reducing the deterioration of antenna efficiency in a high-frequency band in a dual-band antenna device including a folded antenna conductor.

To solve the technical problem described above, according to an aspect of the present disclosure, the present disclosure provides an antenna device that is a dual-band antenna device allowed to perform communication at a first frequency in a predetermined frequency band and at a second frequency in a frequency band higher than the predetermined frequency band. The antenna device includes a ground conductor; a folded antenna conductor including a first linear part and a second linear part that are caused to face each other at a distance by folding; an LC resonant circuit that is included in the folded antenna conductor, that passes the first frequency, and that attenuates the second frequency; and a feeding point between the ground conductor and the folded antenna conductor. A narrow gap part is provided between the first linear part and the second linear part of the folded antenna conductor, the narrow gap part measuring a distance shorter than a distance measured in a different portion between the first linear part and the second linear part.

According to another aspect of the present disclosure, the present disclosure provides an antenna device that is a dual-band antenna device allowed to perform communication at a first frequency in a predetermined frequency band and at a second frequency in a frequency band higher than the predetermined frequency band. The antenna device includes: a ground conductor; a folded antenna conductor including a first linear part and a second linear part that are caused to face each other at a distance by folding; an LC resonant circuit that is included in the folded antenna conductor, that attenuates the first frequency, and that passes the second frequency; and a feeding point between the ground conductor and the folded antenna conductor. A narrow gap part is provided between the first linear part and the second linear part of the folded antenna conductor, the narrow gap part measuring a distance shorter than a distance measured in a different portion between the first linear part and the second linear part. The LC resonant circuit is included in the narrow gap part.

Further, according to another aspect of the present disclosure, the present disclosure provides a radio communication device including: the antenna device; and a feeder circuit that supplies power to the feeding point of the antenna device.

According to the present disclosure, the deterioration of antenna efficiency in a high-frequency band can be reduced in the dual-band antenna device including the folded antenna conductor.

DETAILED DESCRIPTION

Figure 1:
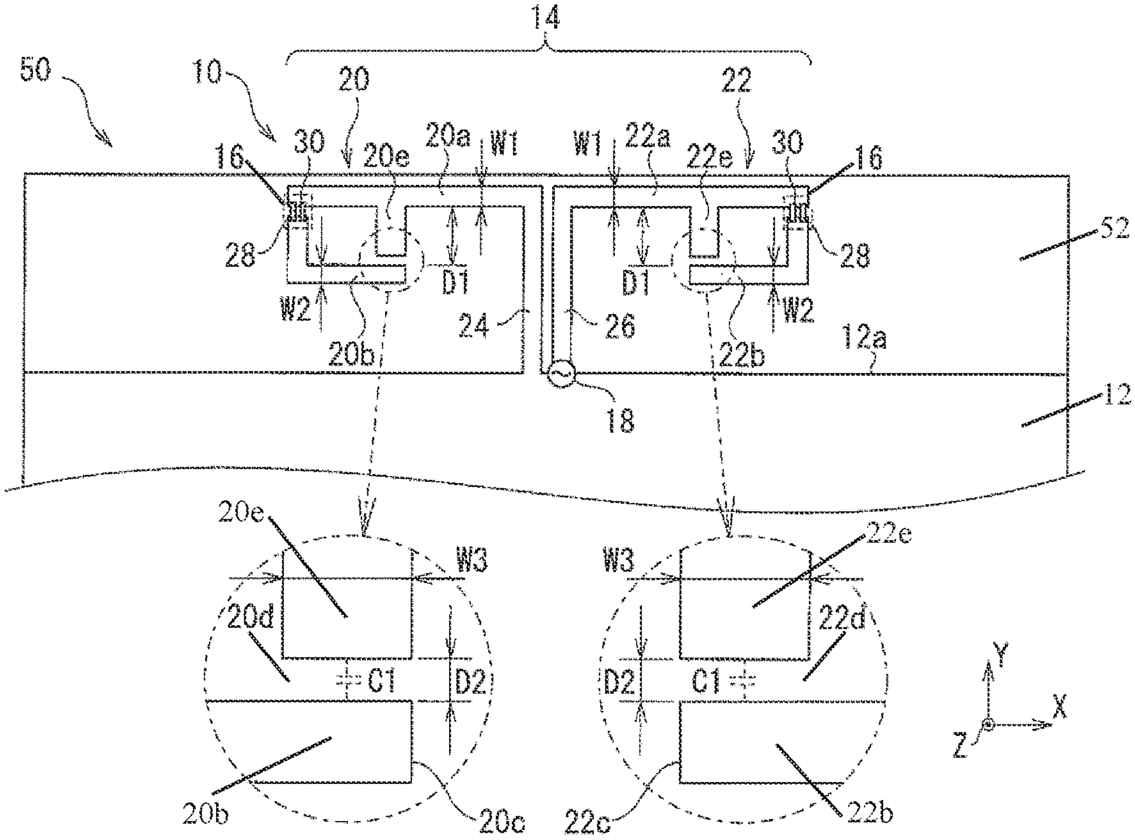
FIG. 1 is a partial top view of a radio communication device including an antenna device according to Embodiment 1 of the present disclosure.

An antenna device according to an aspect of the present disclosure is a dual-band antenna device allowed to perform communication at a first frequency in a predetermined frequency band and at a second frequency in a frequency band higher than the predetermined frequency band. The antenna device includes a ground conductor; a folded antenna conductor including a first linear part and a second linear part that are caused to face each other at a distance by folding; an LC resonant circuit that is included in the folded antenna conductor, that passes the first frequency, and that attenuates the second frequency; and a feeding point between the ground conductor and the folded antenna conductor. A narrow gap part is provided between the first linear part and the second linear part of the folded antenna conductor, the narrow gap part measuring a distance shorter than a distance measured in a different portion between the first linear part and the second linear part.

According to the aspect as above, the deterioration of antenna efficiency in a high-frequency band can be reduced in the dual-band antenna device including the folded antenna conductor.

For example, in a case where the first linear part and the second linear part extend parallel to each other, the antenna device may include a branch part that forms a narrow gap part such that one of the first linear part and the second linear part extends toward a different one of the first linear part and the second linear part.

For example, the distance between the first linear part and the second linear part can be longer than each of respective line widths of the first linear part and the second linear part.

For example, the folded antenna conductor may include a floating-island-like part between the first linear part and the second linear part. The narrow gap part may include a first narrow gap part between the floating-island-like part and the first linear part and a second narrow gap part between the floating-island-like part and the second linear part.

For example, the antenna device may further include a capacitor chip included in the narrow gap part and connecting the first linear part and the second linear part.

For example, the LC resonant circuit may include the capacitor chip and an inductor chip that are disposed in parallel.

For example, the folded antenna conductor may be a folded dipole antenna.

For example, the first frequency may be a frequency in a 2.4 GHz band, and the second frequency may be a frequency in a 5 GHz band.

An antenna device according to another aspect of the present disclosure is a dual-band antenna device allowed to perform communication at a first frequency in a predetermined frequency band and at a second frequency in a frequency band higher than the predetermined frequency band. The antenna device includes: a ground conductor; a folded antenna conductor including a first linear part and a second linear part that are caused to face each other at a distance by folding; an LC resonant circuit that is included in the folded antenna conductor, that attenuates the first frequency, and that passes the second frequency; and a feeding point between the ground conductor and the folded antenna conductor. A narrow gap part is provided between the first linear part and the second linear part of the folded antenna conductor, the narrow gap part measuring a distance shorter than a distance measured in a different portion between the first linear part and the second linear part. The LC resonant circuit is included in the narrow gap part.

According to the aspects as above, the deterioration of the antenna efficiency in the high-frequency band can be reduced in the dual-band antenna device including the folded antenna conductor.

A radio communication device according to another aspect of the present disclosure includes the antenna device and a feeding point of the antenna device that supplies power to a feeder circuit.

According to the aspect as above, the deterioration of the antenna efficiency in the high-frequency band can be reduced in the dual-band radio communication device including the folded antenna conductor.

Hereinafter, embodiments of the present disclosure will be described with reference to the drawings.

Embodiment 1

FIG. 1 is a partial top view of a radio communication device including an antenna device according to Embodiment 1 of the present disclosure. Note that the X-Y-Z orthogonal coordinate system illustrated in the drawings is provided for easier understanding of the present disclosure and does not limit the disclosure.

As illustrated in FIG. 1, a radio communication device 50 including an antenna device 10 according to Embodiment 1 is used, being installed in an electronic device capable of radio communication. The antenna device 10 is a dual-band antenna device allowed to perform communication at a first frequency in a predetermined frequency band and at a second frequency in a frequency band higher than the predetermined frequency band. In the case of Embodiment 1, the first frequency is a frequency in a 2.4 GHz band (for example, 2.4 to 2.484 GHz), and the second frequency is a frequency in a 5 GHz band (for example, 5.15 to 5.85 GHz).

As illustrated in FIG. 1, in the case of Embodiment 1, the antenna device 10 includes a ground conductor 12 that is provided on a base substrate 52 of the radio communication device 50 and a folded antenna conductor 14 that is provided on the base substrate 52 and that is connected to the ground conductor 12. The antenna device 10 also includes LC resonant circuits 16 included in the folded antenna conductor 14 and a feeding point 18 between the ground conductor 12 and the folded antenna conductor 14. Note that a feeder circuit (not illustrated) included in the radio communication device 50 is connected to the feeding point 18. The antenna device 10 receives power from the feeder circuit via the feeding point 18.

In the case of Embodiment 1, the ground conductor 12 of the antenna device 10 is a conductor pattern formed on the base substrate 52 and formed from an insulating material such as copper.

In the case of Embodiment 1, the folded antenna conductor 14 of the antenna device 10 is what is called a folded dipole antenna and is a conductor pattern formed from, for example, copper on the base substrate 52.

Specifically, the folded antenna conductor 14 includes a first element part 20 and a second element part 22 in a symmetrical structure (with respect to the Y axis). The folded antenna conductor 14 also includes a parasitic line part 24 and a feeding line part 26 that respectively connect the first element part 20 and the second element part 22 to the ground conductor 12.

The first element part 20 in the folded antenna conductor 14 is connected to an edge 12*a* of the ground conductor 12 (one end in the Y axis) with the parasitic line part 24 interposed therebetween. The first element part 20 also includes a first linear part 20*a* and a second linear part 20*b* that are caused to face each other at a distance by the folding.

Specifically, the first element part 20 in the folded antenna conductor 14 extends from the parasitic line part 24 toward an outer side portion (in a negative direction along the X axis) and then extends toward an inner side portion (in a positive direction along the X axis) in such a manner as to change the direction by 180 degrees, that is, being folded. As the result, the first element part 20 includes the first linear part 20*a* and the second linear part 20*b* that face each other at a distance.

Note that in the case of Embodiment 1, in the first element part 20, the first linear part 20*a* and the second linear part 20*b* are parallel to each other, are a distance D1 spaced, and extend parallel to the edge 12*a* of the ground conductor 12. The distance D1 can be longer than each of widths W1 and W2 of the respective first and second linear parts 20*a* and 20*b*. Unlike this, if the distance D1 is shorter than each of the widths W1 and W2, a magnetic field generated by current flowing through the first linear part 20*a* hinders the flow of current flowing in an opposite direction through the second linear part 20*b*.

The second linear part 20*b* of the first element part 20 also includes an open end 20*c*. The electrical length of the first element part 20 from the parasitic line part 24 to the open end 20*c* is substantially ¼ the length of the wavelength of the first frequency.

The second element part 22 in the folded antenna conductor 14 is connected to the edge 12*a* of the ground conductor 12 with the feeding line part 26 interposed therebetween. The second element part 22 includes a first linear part 22*a* and a second linear part 22*b* that are caused to face each other at a distance by the folding.

Specifically, the second element part 22 in the folded antenna conductor 14 extends from the feeding line part 26 toward an outer side portion (in the positive direction along the X axis), then extends toward an inner side portion (in the negative direction along the X axis) in such a manner as to change the direction by 180 degrees, that is, being folded, and terminates. As the result, the second element part 22 includes the first linear part 22*a* and the second linear part 22*b* that face each other at a distance.

Note that in the case of Embodiment 1, in the second element part 22, the first linear part 22*a* and the second linear part 22*b* are parallel to each other, are the distance D1 spaced, and extend parallel to the edge 12*a* of the ground conductor 12. The distance D1 can be longer than each of the widths W1 and W2 of the respective first and second linear parts 22*a* and 22*b*.

The second linear part 22*b* of the second element part 22 includes an open end 22*c*. The electrical length of the second element part 22 from the feeding line part 26 to the open end 22*c* is ¼ the length of the wavelength of the first frequency.

Further, the first linear part 20*a* of the first element part 20 and the first linear part 22*a* of the second element part 22 are located on one straight line, and the second linear part 20*b* of the first element part 20 and the second linear part 22*b* of the second element part 22 are located on one straight line.

Note that in the case of Embodiment 1, the feeding point 18 is provided between the ground conductor 12 and the folded antenna conductor 14. In the case of Embodiment 1, the feeding point 18 is provided in the connecting part between the ground conductor 12 and the feeding line part 26.

The LC resonant circuits 16 are respectively provided in the first element part 20 and the second element part 22 of the folded antenna conductor 14. In the case of Embodiment 1, the LC resonant circuits 16 respectively include capacitor chips 28 having predetermined capacitance and inductor chips 30 disposed parallel to the respective capacitor chips 28 and having predetermined inductance.

Each LC resonant circuit 16 is an LC parallel circuit that passes the first frequency in the predetermined lower frequency band but attenuates the second frequency in the frequency band higher than the predetermined frequency band, that is, that resonates at the first frequency. The LC resonant circuit 16 is provided in a corresponding one of the first and second element parts 20 and 22 at a position away by ¼ of the wavelength of the second frequency from a corresponding one of the parasitic line part 24 and the feeding line part 26.

According to the antenna device 10 as described above, the first and second element parts 20 and 22 of the folded antenna conductor 14 function as the dipole antenna. In addition, since the first and second element parts 20 and 22 are folded, the antenna device 10 (that is, the radio communication device 50) is downsized compared with a case where the first and second element parts 20 and 22 extend on the straight line without necessarily being folded.

Further, when communication is performed at the first frequency in the predetermined lower frequency band, current flows through the entire first and second element parts 20 and 22. In contrast, when communication is performed at the second frequency in the frequency band higher than the predetermined frequency band, current flows through each of portions of the respective first and second element parts 20 and 22 between a corresponding one of the parasitic line part 24 and the feeding line part 26 and the corresponding LC resonant circuit 16. That is, each LC resonant circuit 16 functions as a band elimination filter for the second frequency. The antenna device 10 functions as the dual-band antenna allowed to perform communication at the first and second frequencies.

However, the inventor has found that there is a possibility of deterioration of antenna efficiency at the second frequency in the higher frequency band in the antenna device 10 as described above. The inventor has also identified the cause thereof and found out the following configurations to cope therewith.

As illustrated in FIG. 1, to reduce the deterioration of the antenna efficiency at the second frequency in the higher frequency band, a narrow gap part 20*d* is provided between the first linear part 20*a* and the second linear part 20*b* of the first element part 20 of the folded antenna conductor 14, the narrow gap part 20*d* measuring a distance D2 shorter than the distance D1 measured in the different portion. Likewise, a narrow gap part 22*d* is provided between the first linear part 22*a* and the second linear part 22*b* of the second element part 22, the narrow gap part 22*d* measuring the distance D2 shorter than the distance D1 measured in the different portion.

In the case of Embodiment 1, the first linear part 20*a* of the first element part 20 includes a branch part 20*e* extending toward the second linear part 20*b* and forming the narrow gap part 20*d* between the first linear part 20*a* and the second linear part 20*b*. Likewise, the first linear part 22*a* of the second element part 22 includes a branch part 22*e* extending toward the second linear part 22*b* and forming the narrow gap part 22*d* between the first linear part 22*a* and the second linear part 22*b*.

As illustrated in FIG. 1, the branch part 20*e* as described above causes capacitance Cl to be generated between the branch part 20*e* of the first linear part 20*a* of the first element part 20 and the second linear part 20*b*. Likewise, the branch part 22*e* causes capacitance Cl to be generated between the branch part 20*e* of the first linear part 22*a* of the second element part 22 and the second linear part 22*b*.

Advantageous effects exerted by providing the narrow gap parts 20*d* and 22*d* as described above will be described.

Figure 2:
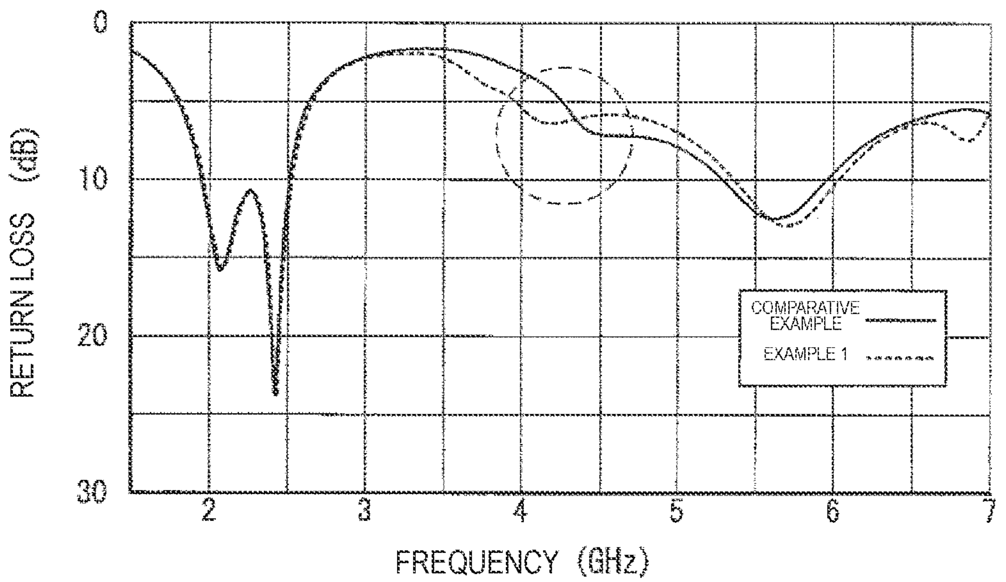
FIG. 2 is a graph illustrating the frequency characteristic of the return loss of each of the antenna device according to Embodiment 1 and an antenna device in Comparative Example.
Figure 3:
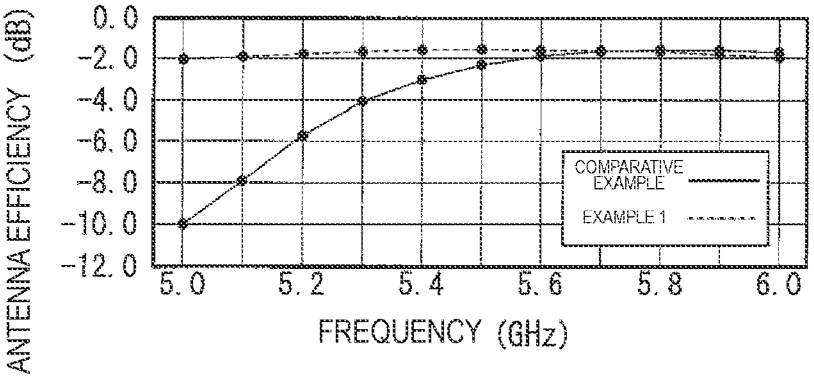
FIG. 3 is a graph illustrating antenna efficiency in a high-frequency band of each of the antenna device according to Embodiment 1 and the antenna device in Comparative Example.

FIG. 2 is a graph illustrating the frequency characteristic of the return loss of each of the antenna device according to Embodiment 1 and an antenna device in Comparative Example. FIG. 3 is a graph illustrating antenna efficiency in the high-frequency band of each of the antenna device according to Embodiment 1 and the antenna device in Comparative Example.

In FIGS. 2 and 3, the antenna device in Comparative Example is substantially the same as an antenna device obtained by removing the branch parts 20*e* and 22*e* from the antenna device 10 according to Embodiment 1. The widths W1 of the respective first linear parts 20*a* and 22*a* and the widths W2 of the respective second linear parts 20*b* and 22*b* are each 1 mm, and a width W3 of each of the branch parts 20*e* and 22*e* is 1.5 mm. In addition, the first linear parts 20*a* and 22*a* are each 26.5 mm long, and the second linear parts 20*b* and 22*b* are each 6 mm long. Further, the distance D1 between each of the first linear parts 20*a* and 22*a* and a corresponding one of the second linear parts 20*b* and 22*b* is 3 mm, and the distance D2 of each of the narrow gap parts 20*d* and 22*d* is 0.5 mm. The capacitance of each capacitor chip 28 of the corresponding LC resonant circuit 16 is 0.3 pF, and the inductance of each inductor chip 30 is 2.8 nH.

As illustrated in FIG. 2, providing the branch parts 20*e* and 22*e* causes frequency shift to a lower frequency in frequencies between a low-frequency band (2.4 GHz band) and a high-frequency band (5 GHz band) (the area surrounded by the broken line circle). Specifically, a harmonic wave at the first frequency (about 2.4 GHz) in the low-frequency band interferes with the fundamental (about 5.7 GHz) at the second frequency in the high-frequency band in the antenna device in Comparative Example without necessarily the branch parts 20*e* and 22*e*, but providing the branch parts 20*e* and 22*e* causes the harmonic wave to be shifted to a lower frequency. As illustrated in FIG. 3, this improves the antenna efficiency in the high-frequency band, particularly in the lower frequency area in the high-frequency band. As the result, a high antenna frequency is obtained all over the high-frequency band.

Note that the shifting degree of the harmonic wave at the first frequency can be controlled by changing the width W3 and the location of the branch parts 20*e* and 22*e*.

Figure 4:
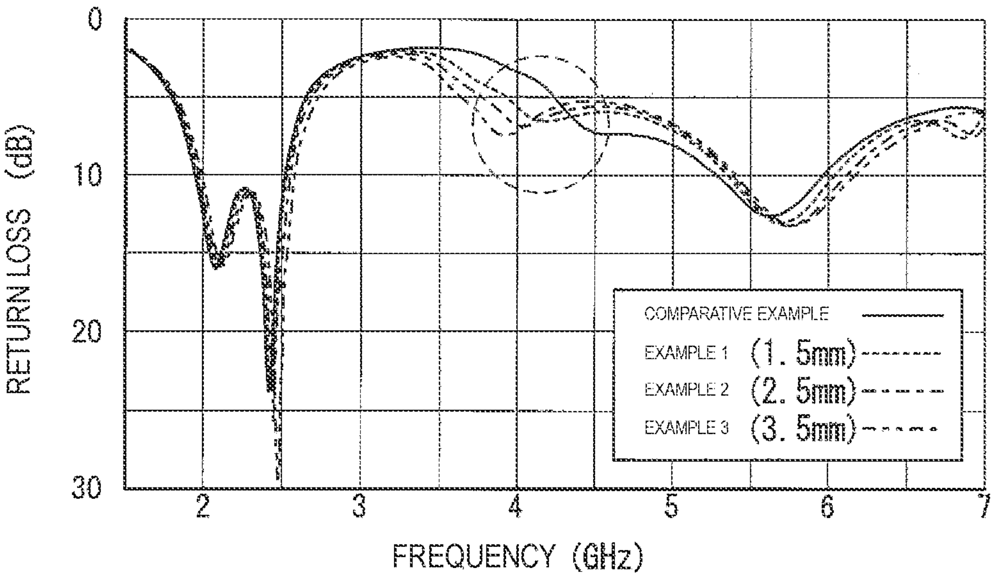
FIG. 4 is a graph illustrating relationships between a return loss characteristic and branch part widths in each of the antenna device according to Embodiment 1 and the antenna device in Comparative Example.
Figure 5:
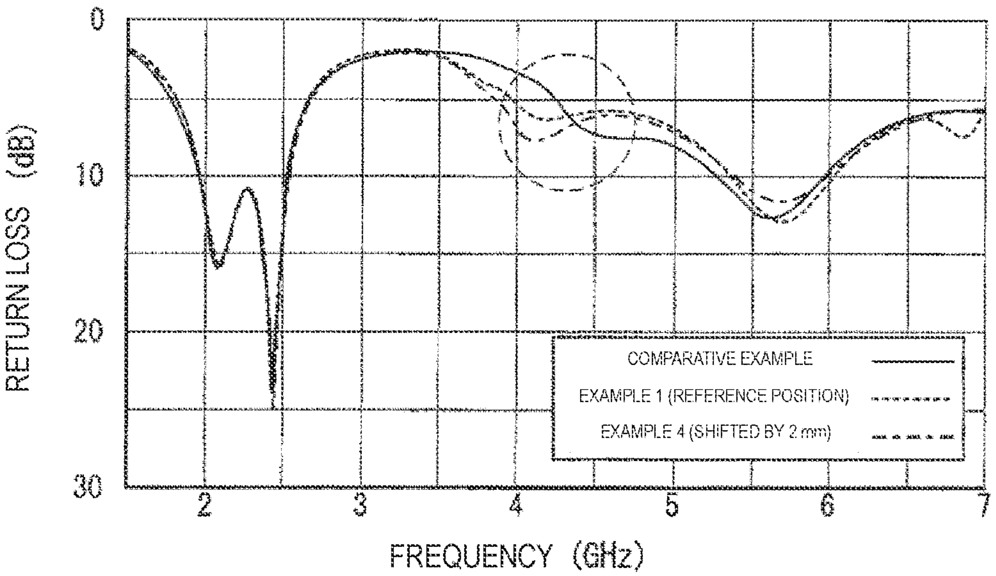
FIG. 5 is a graph illustrating relationships between the return loss characteristic and branch part locations in each of the antenna device according to Embodiment 1 and the antenna device in Comparative Example.

FIG. 4 is a graph illustrating relationships between a return loss characteristic and branch part widths in each of the antenna device according to Embodiment 1 and the antenna device in Comparative Example. FIG. 5 is a graph illustrating relationships between the return loss characteristic and branch part locations in each of the antenna device according to Embodiment 1 and the antenna device in Comparative Example.

As illustrated in Examples 1 to 3 in FIG. 4, increasing the width W3 of each of the branch parts 20*e* and 22*e* causes each harmonic wave at the first frequency to be shifted to a lower frequency. In addition, as illustrated in Examples 1 and 4 in FIG. 5, moving the branch parts 20*e* and 22*e* toward the respective outer side portions (farther from the parasitic line part 24 and the feeding line part 26), for example, by only 2 mm also causes each harmonic wave at the first frequency to be shifted to a lower frequency.

Thus, as illustrated in FIGS. 4 and 5, appropriately changing the width W3 and the location of each of the branch parts 20*e* and 22*e* enables the shifting degree of the harmonic wave at the first frequency to be controlled desirably. As the result, the interference of the harmonic wave at the first frequency with the fundamental at the second frequency can be reduced more.

According to Embodiment 1 as described above, the deterioration of the antenna efficiency in the high-frequency band can be reduced in the dual-band antenna device 10 including the folded antenna conductor 14.

Note that in the case of Embodiment 1, as illustrated in FIG. 1, each of the branch parts 20*e* and 22*e* extends from a corresponding one of the first linear parts 20*a* and 22*a* to form a corresponding one of the narrow gap parts 20*d* and 22*d* between a corresponding one of the branch parts 20*e* and 22*e* and a corresponding one of the second linear parts 20*b* and 22*b*. Instead of this, branch parts may each extend from a corresponding one of second linear parts to form a narrow gap part between a corresponding one of the branch parts and a corresponding one of first linear parts.

Embodiment 2

Embodiment 2 is an embodiment improved from Embodiment 1 described above. Embodiment 2 will thus be described with a focus on a point different from Embodiment 1 above. Note that substantially the same components in Embodiment 2 as the components in Embodiment 1 above are denoted by the same reference numerals.

Figure 6:
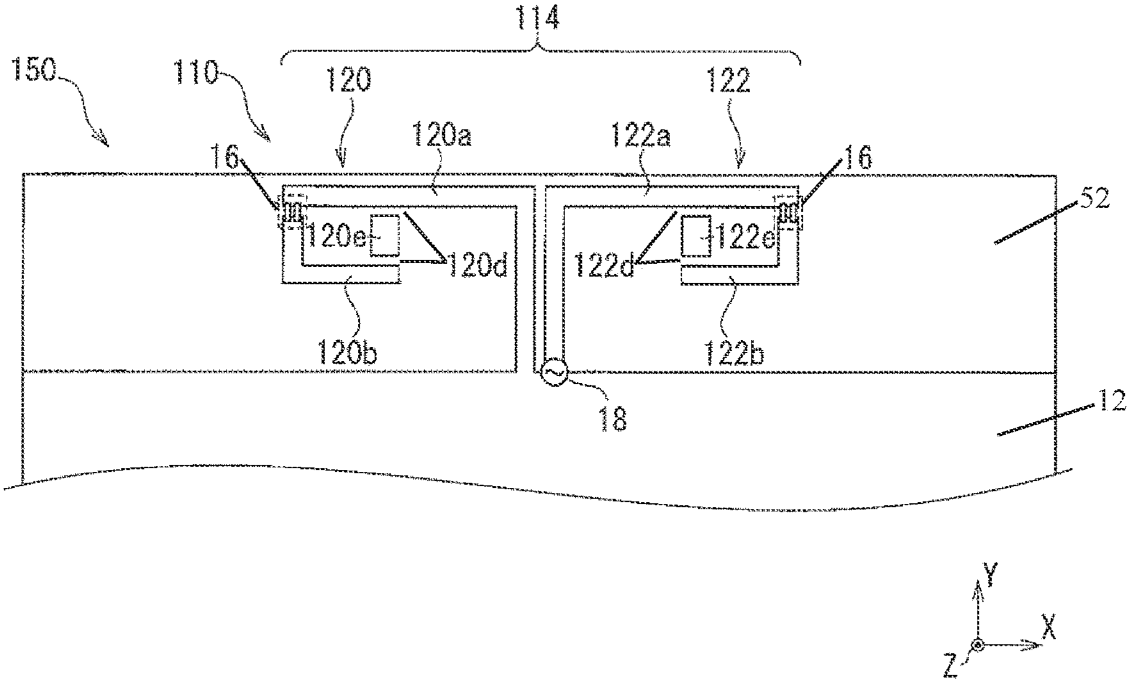
FIG. 6 is a partial top view of a radio communication device including an antenna device according to Embodiment 2 of the present disclosure.

FIG. 6 is a partial top view of a radio communication device including an antenna device according to Embodiment 2 of the present disclosure.

As illustrated in FIG. 6, an antenna device 110 according to Embodiment 2 is included in a radio communication device 150. A folded antenna conductor 114 of the antenna device 110 includes a first element part 120 and a second element part 122. The first and second element parts 120 and 122 each includes a corresponding one of first linear parts 120*a* and 122*a* and a corresponding one of second linear parts 120*b* and 122*b*. The corresponding one of the first linear parts 120*a* and 122*a* and the corresponding one of the second linear parts 120*b* and 122*b* are caused to face each other at a distance by the folding.

Narrow gap parts 120*d* are provided between the first linear part 120*a* and the second linear part 120*b* of the first element part 120, the narrow gap parts 120*d* each measuring a distance shorter than a distance measured in the other portions therebetween. Likewise, narrow gap parts 122*d* are provided between a first linear part 122*a* and a second linear part 122*b* of the second element part 122, the narrow gap parts 122*d* each measuring a distance shorter than a distance measured in the other portions therebetween.

Unlike Embodiment 1 above, in the case of Embodiment 2, branch parts do not extend from the first linear parts 120*a* and 122*a* and thus do not form the narrow gap parts 120*d* and 122*d*.

Instead, the first and second element parts 120 and 122 of the folded antenna conductor 114 respectively include floating-island-like parts 120*e* and 122*e* each provided between a corresponding one of the first linear parts 120*a* and 122*a* and a corresponding one of the second linear parts 120*b* and 122*b*.

The floating-island-like parts 120*e* and 122*e* are not respectively continuous with the first linear parts 120*a* and 122*a* and the second linear parts 120*b* and 122*b* and each have one end forming a corresponding one of the narrow gap parts 120*d* and 122*d* (first narrow gap parts) between the one end and a corresponding one of the first linear parts 120*a* and 122*a* and the other end forming a corresponding one of the narrow gap parts 120*d* and 122*d* (second narrow gap parts) between the other end and a corresponding one of the second linear parts 120*b* and 122*b*.

Also in Embodiment 2 as described above, like Embodiment 1 above, the deterioration of the antenna efficiency in the high-frequency band can be reduced in the dual-band antenna device 110 including the folded antenna conductor 114.

Embodiment 3

Embodiment 3 is an embodiment improved from Embodiment 1 described above. Embodiment 3 will thus be described with a focus on a point different from Embodiment 1 above. Note that substantially the same components in Embodiment 3 as the components in Embodiment 1 above are denoted by the same reference numerals.

Figure 7:
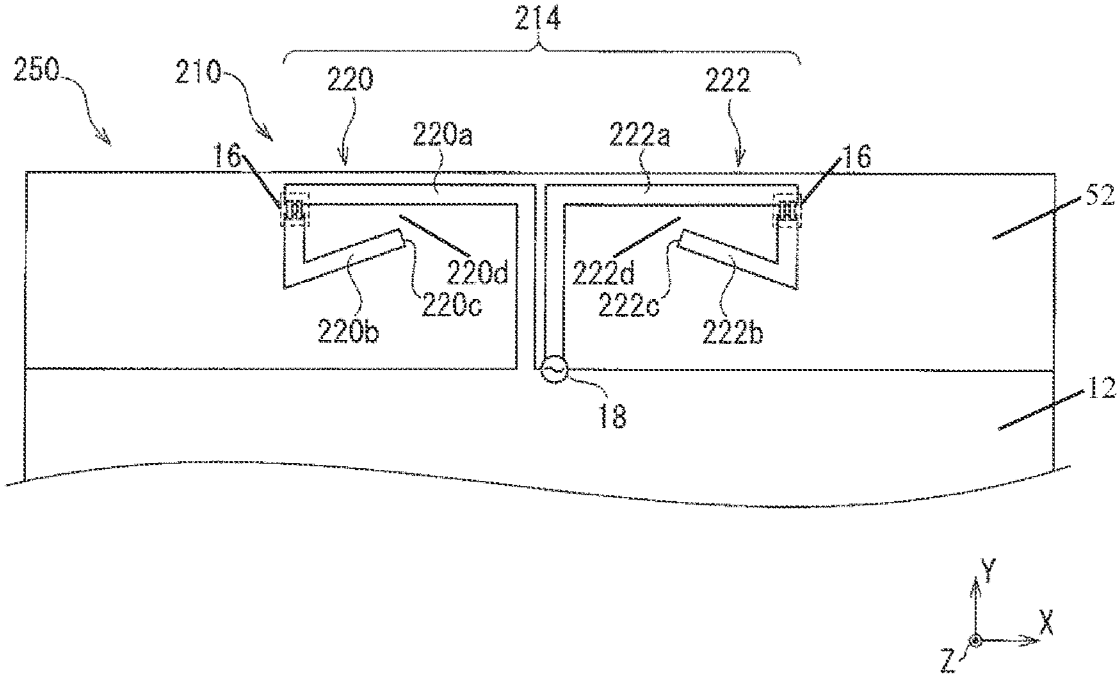
FIG. 7 is a partial top view of a radio communication device including an antenna device according to Embodiment 3 of the present disclosure.

FIG. 7 is a partial top view of a radio communication device including an antenna device according to Embodiment 3 of the present disclosure.

As illustrated in FIG. 7, an antenna device 210 according to Embodiment 3 is included in a radio communication device 250. A folded antenna conductor 214 of the antenna device 210 includes a first element part 220 and a second element part 222. The first and second element parts 220 and 222 each includes a corresponding one of first linear parts 220*a* and 222*a* and a corresponding one of second linear parts 220*b* and 222*b*. The corresponding one of the first linear parts 220*a* and 222*a* and the corresponding one of the second linear parts 220*b* and 222*b* are caused to face each other at a distance by the folding.

A narrow gap part 220*d* is provided between the first linear part 220*a* and the second linear part 220*b* of the first element part 220, the narrow gap part 220*d* measuring a distance shorter than a distance measured in the other portions therebetween. Likewise, a narrow gap part 222*d* is provided between a first linear part 222*a* and a second linear part 222*b* of the second element part 222, the narrow gap part 222*d* measuring a distance shorter than a distance measured in the other portions therebetween.

Unlike Embodiment 1 above, in the case of Embodiment 3, branch parts do not extend from the first linear parts 220*a* and 222*a* and thus do not form the narrow gap parts 220*d* and 222*d*. In addition, unlike Embodiment 2 above, any of floating-island-like parts is not formed between a corresponding one of the first linear parts 220*a* and 222*a* and a corresponding one of the second linear parts 220*b* and 222*b* and thus does not form a corresponding one of the narrow gap parts 220*d* and 222*d*.

Instead, the second linear parts 220*b* and 222*b* extend obliquely with respect to a direction in which the first linear parts 220*a* and 222*a* extend (X-axis direction), in such a manner that portions, of the second linear parts 220*b* and 222*b*, closer to open ends 220*c* and 222*c* become closer to the first linear parts 220*a* and 222*a*. As the result, the narrow gap parts 220*d* and 222*d* are each formed between a corresponding one of the open ends 220*c* and 222*c* and a corresponding one of the first linear parts 220*a* and 222*a*.

Also in Embodiment 3 as described above, like Embodiment 1 above, the deterioration of the antenna efficiency in the high-frequency band can be reduced in the dual-band antenna device 210 including the folded antenna conductor 214.

Embodiment 4

Embodiment 4 is an embodiment improved from Embodiment 1 described above. Embodiment 4 will thus be described with a focus on a point different from Embodiment 1 above. Note that substantially the same components in Embodiment 4 as the components in Embodiment 1 above are denoted by the same reference numerals.

Figure 8:
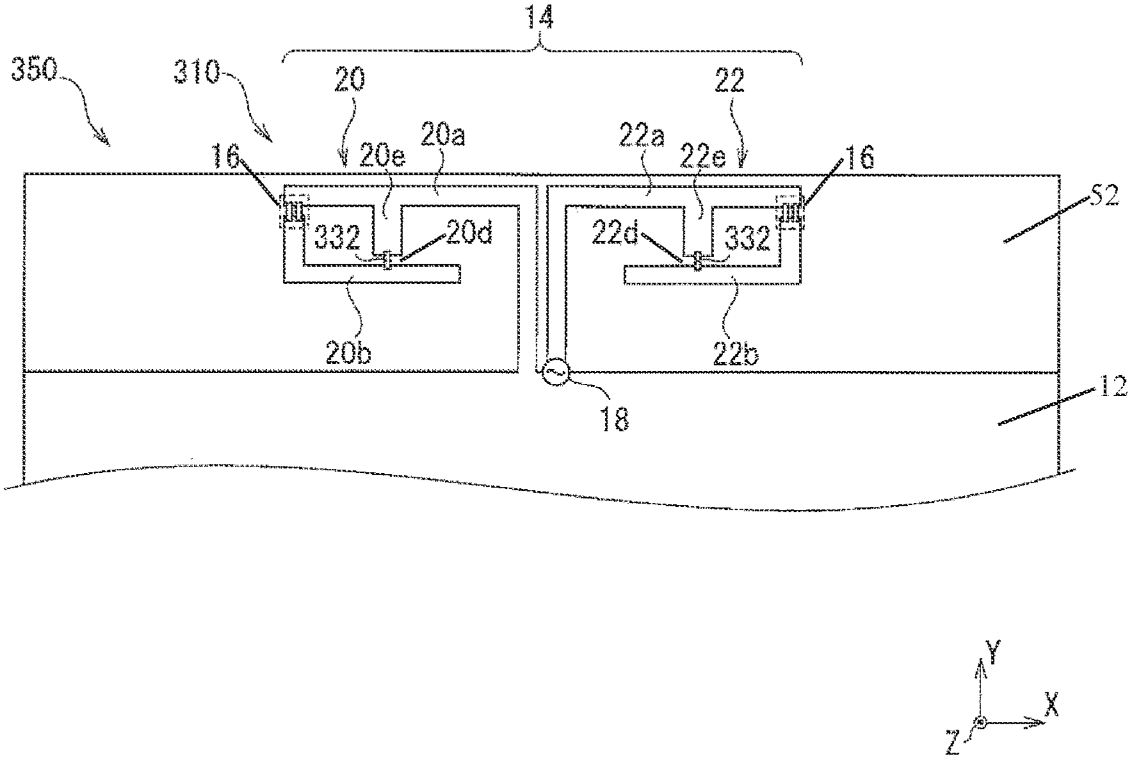
FIG. 8 is a partial top view of a radio communication device including an antenna device according to Embodiment 4 of the present disclosure.

FIG. 8 is a partial top view of a radio communication device including an antenna device according to Embodiment 4 of the present disclosure.

As illustrated in FIG. 8, an antenna device 310 according to Embodiment 4 is included in a radio communication device 350. The antenna device 310 according to Embodiment 4 also includes the folded antenna conductor 14 of the antenna device 10 in Embodiment 1 above. The different point is that capacitor chips 332 each connecting a corresponding one of the first linear parts 20*a* and 22*a* and a corresponding one of the second linear parts 20*b* and 22*b* are provided in a corresponding one of the narrow gap parts 20*d* and 22*d* of a corresponding one of the first and second element parts 20 and 22 of the folded antenna conductor 14.

Appropriately selecting capacity value of the capacitor chips 332 enables the capacitance Cl in the narrow gap parts 20*d* and 22*d* to be controlled desirably and easily (for example, compared with the case of changing the shape of the folded antenna conductor 14). The shifting degree of the harmonic wave at the first frequency can thereby be controlled desirably. As the result, the interference of the harmonic wave at the first frequency with the fundamental at the second frequency can be reduced more.

Also in Embodiment 4 as described above, like Embodiment 1 above, the deterioration of the antenna efficiency in the high-frequency band can be reduced in the dual-band antenna device 310 including the folded antenna conductor 14.

Embodiment 5

In the case of Embodiment 1, to function as the dual-band antenna device, the antenna device 10 includes the LC resonant circuits 16. Each LC resonant circuit 16 is the LC parallel circuit that passes the first frequency in the lower frequency band but attenuates the second frequency in the higher frequency band, that is, that resonates at the first frequency. In contrast, LC resonant circuits of the antenna device in Embodiment 5 perform different operations. Embodiment 5 will thus be described with a focus on a point different from Embodiment 1 above. Note that substantially the same components in Embodiment 5 as the components in Embodiment 1 above are denoted by the same reference numerals.

Figure 9:
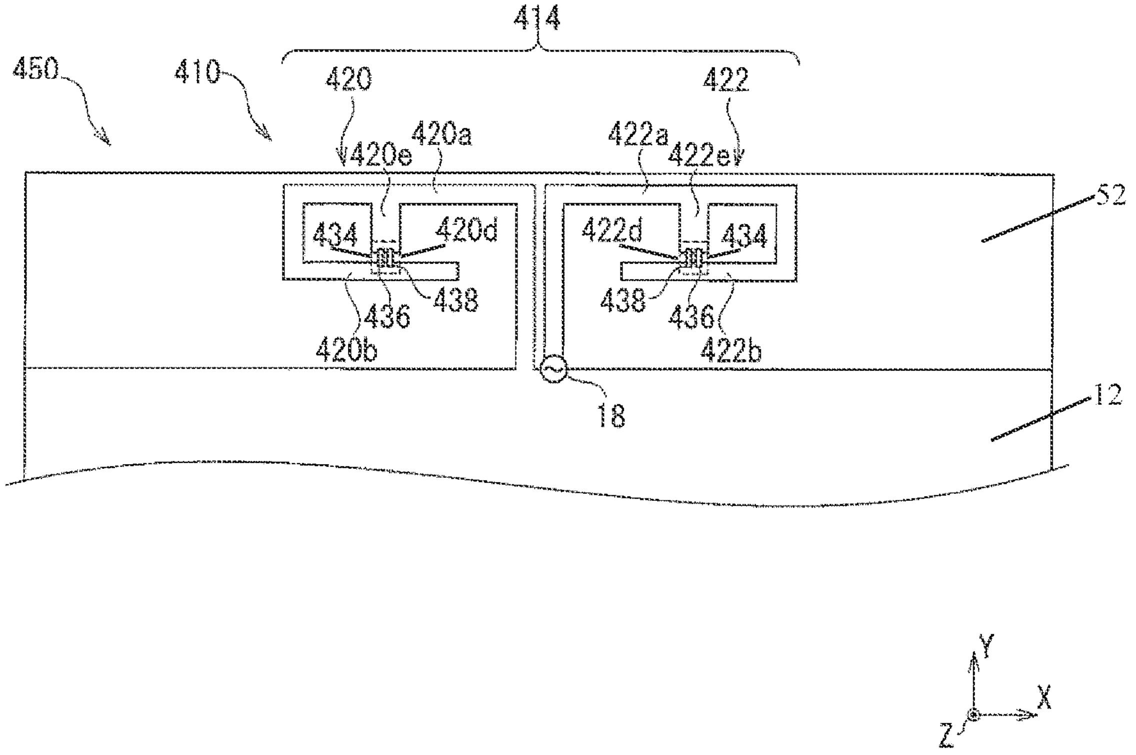
FIG. 9 is a partial top view of a radio communication device including an antenna device according to Embodiment 5 of the present disclosure.

FIG. 9 is a partial top view of a radio communication device including an antenna device according to Embodiment 5 of the present disclosure.

As illustrated in FIG. 9, an antenna device 410 according to Embodiment 5 is included in a radio communication device 450. The antenna device 410 includes a folded antenna conductor 414 including a first element part 420 and a second element part 422.

The first element part 420 of the folded antenna conductor 414 includes a first linear part 420*a* and a second linear part 420*b* that are caused to face each other at a distance by the folding. Likewise, the second element part 422 also includes a first linear part 422*a* and a second linear part 422*b* that are caused to face each other at a distance by the folding.

In addition, a narrow gap part 420*d* is provided between the first linear part 420*a* and the second linear part 420*b* of the first element part 420, the narrow gap part 420*d* measuring a distance shorter than a distance measured in the other portions therebetween. In the case of Embodiment 5, the first linear part 420*a* includes a branch part 420*e* extending toward the second linear part 420*b* and forming the narrow gap part 420*d* between the branch part 420*e* and the second linear part 420*b*.

Likewise, a narrow gap part 422*d* is also provided between the first linear part 422*a* and the second linear part 422*b* of the second element part 422, the narrow gap part 422*d* measuring a distance shorter than a distance measured in the other portions therebetween. In the case of Embodiment 5, the first linear part 422*a* includes a branch part 422*e* extending toward the second linear part 422*b* and forming the narrow gap part 422*d* between the branch part 422*e* and the second linear part 422*b*.

In the case of Embodiment 5, LC resonant circuits 434 are respectively provided in the narrow gap parts 420*d* and 422*d* of the respective first and second element parts 420 and 422 and each connect a corresponding one of the first linear parts 420*a* and 422*a* and a corresponding one of the second linear parts 420*b* and 422*b*.

In addition, in the case of Embodiment 5, LC resonant circuits 434 respectively include capacitor chips 436 having predetermined capacitance and inductor chips 438 disposed parallel to the respective capacitor chips 436 and having predetermined inductance.

Further, unlike the LC resonant circuits 16 in Embodiment 1 above, the LC resonant circuits 434 in Embodiment 5 let the second frequency in the higher frequency band pass but let the first frequency in the lower frequency band attenuate, that is, resonate at the first frequency. The capacitance of each capacitor chip 436 of the corresponding LC resonant circuit 434 is 2.1 pF, and the inductance of each inductor chip 438 is 2.0 nH.

The antenna device 410 according to Embodiment 5 as described above also provides the same advantageous effects as those in Embodiment 1 above.

Figure 10:
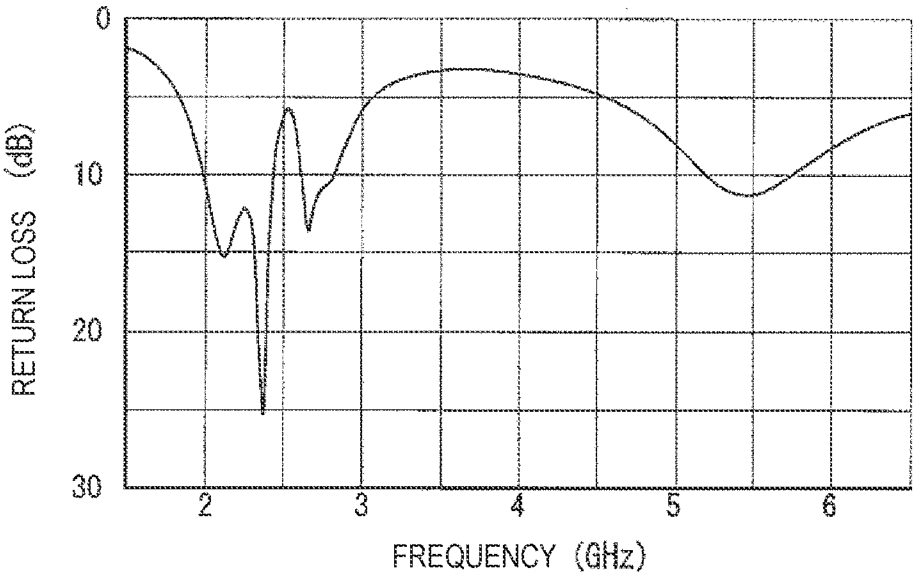
FIG. 10 is a graph illustrating the frequency characteristic of the return loss of the antenna device according to Embodiment 5.

FIG. 10 is a graph illustrating the frequency characteristic of the return loss of the antenna device according to Embodiment 5.

As illustrated in FIG. 10, in the antenna device 410 according to Embodiment 5, the harmonic wave (about 2.8 GHz) of the fundamental (about 2.4 GHz) at the first frequency in the low-frequency band (2.4 GHz band) is considerably away from the fundamental at the second frequency (about 5.5 GHz) in the high-frequency band (5 GHz band). The interference of this harmonic wave with the fundamental at the second frequency is thereby reduced. As the result, the high antenna frequency is obtained all over the high-frequency band.

Also in Embodiment 5 as described above, like Embodiment 1 above, the deterioration of the antenna efficiency in the high-frequency band can be reduced in the dual-band antenna device 410 including the folded antenna conductor 414.

The present disclosure has heretofore been described by citing embodiments, but the embodiments of the present disclosure are not limited to these embodiments.

For example, in the cases of Embodiment 1 and Embodiment 5 above, the LC resonant circuits 16 and 434 each includes the capacitor chip and the inductor chip that are disposed in parallel. The antenna devices are thereby downsized. However, the configuration of the LC resonant circuits is not limited to this configuration. For example, a capacitor element composed of a pair of parallel conductor patterns and an inductor element as a meandering conductor pattern may form an LC resonant circuit on the base substrate.

In addition, for example, in the cases of Embodiments 1 to 5 above, each folded antenna conductor is the folded dipole antenna. However, the antenna conductor according to each embodiment of the present disclosure is not limited to this. The folded antenna conductor may be another folded wire antenna such as a folded monopole antenna or a folded inverted-F antenna.

The present disclosure has heretofore been described by citing embodiments, it is obvious for those skilled in the art that an embodiment may be combined as a whole or partially with at least one different embodiment to obtain a further embodiment according to the present disclosure.

INDUSTRIAL APPLICABILITY

The present disclosure is applicable to a dual-band antenna device including a linear antenna conductor.

The invention claimed is:

1. A dual-band antenna device configured to perform communication at a first frequency in a predetermined frequency band and at a second frequency in a frequency band higher than the predetermined frequency band, the antenna device comprising:

a ground conductor;

a folded antenna conductor comprising a first linear part and a second linear part that face each other;

an LC resonant circuit that is in the folded antenna conductor, that is configured to pass the first frequency, and that is configured to attenuate the second frequency; and a feeding point between the ground conductor and the folded antenna conductor, wherein there is a narrow gap between the first linear part and the second linear part of the folded antenna conductor, a distance between the first linear part and the second linear part being shorter at the narrow gap than at a portion between the first linear part and the second linear part other than the narrow gap, wherein the second linear part connects to the feeding point through the first linear part, wherein the folded antenna conductor comprises a floating-island-like part between the first linear part and the second linear part, and wherein the narrow gap includes a first narrow gap part between the floating-island-like part and the first linear part, and a second narrow gap part between the floating-island-like part and the second linear part.

2. The antenna device according to claim 1, wherein the first linear part and the second linear part extend parallel to each other.

3. The antenna device according to claim 2, wherein the distance between the first linear part and the second linear part at the portion other than the narrow gap is longer than line widths of the first linear part and the second linear part.

4. The antenna device according to claim 1, further comprising:

a capacitor chip in the narrow gap, the capacitor chip connecting the first linear part to the second linear part.

5. The antenna device according to claim 4, wherein the LC resonant circuit comprises the capacitor chip and an inductor chip that are connected in parallel.

6. The antenna device according to claim 1, wherein the folded antenna conductor is a folded dipole antenna.

7. The antenna device according to claim 1, wherein the first frequency is a frequency in a 2.4 GHz band, and wherein the second frequency is a frequency in a 5 GHz band.

8. A dual-band antenna device configured to perform communication at a first frequency in a predetermined frequency band and at a second frequency in a frequency band higher than the predetermined frequency band, the antenna device comprising:

a ground conductor;

a folded antenna conductor comprising a first linear part and a second linear part that face each other;

an LC resonant circuit that is in the folded antenna conductor, that is configured to attenuate the first frequency, and that is configured to pass the second frequency; and a feeding point between the ground conductor and the folded antenna conductor, wherein there is a narrow gap between the first linear part and the second linear part of the folded antenna conductor, a distance between the first linear part and the second linear part being shorter at the narrow gap than at a portion between the first linear part and the second linear part other than the narrow gap, and wherein the LC resonant circuit is in the narrow gap, wherein the second linear part connects to the feeding point through the first linear part, wherein the folded antenna conductor comprises a floating-island-like part between the first linear part and the second linear part, and wherein the narrow gap includes a first narrow gap part between the floating-island-like part and the first linear part, and a second narrow gap part between the floating-island-like part and the second linear part.

9. The antenna device according to claim 8, wherein the first linear part and the second linear part extend parallel to each other.

10. The antenna device according to claim 9, wherein the distance between the first linear part and the second linear part at the portion other than the narrow gap is longer than line widths of the first linear part and the second linear part.

11. The antenna device according to claim 8, further comprising:

a capacitor chip in the narrow gap, the capacitor chip connecting the first linear part to the second linear part.

12. The antenna device according to claim 11, wherein the LC resonant circuit comprises the capacitor chip and an inductor chip that are connected in parallel.

13. The antenna device according to claim 8, wherein the folded antenna conductor is a folded dipole antenna.

14. The antenna device according to claim 8, wherein the first frequency is a frequency in a 2.4 GHz band, and wherein the second frequency is a frequency in a 5 GHz band.

15. A radio communication device comprising:

the antenna device according to claim 1; and a feeder circuit configured to supply power to the feeding point of the antenna device.

16. A radio communication device comprising:

the antenna device according to claim 8; and a feeder circuit configured to supply power to the feeding point of the antenna device.

* * * * *